(12) United States Patent
Krozek

(10) Patent No.: US 7,757,533 B2
(45) Date of Patent: Jul. 20, 2010

(54) FORMING DIE HAVING FILLER CAM ASSEMBLY

(75) Inventor: Jeffrey C. Krozek, Utica, MI (US)

(73) Assignee: Helical Cam, LLC, Algonac, MI (US)

( * ) Notice: Subject to any disclaimer, the term of this patent is extended or adjusted under 35 U.S.C. 154(b) by 0 days.

(21) Appl. No.: 12/404,055

(22) Filed: Mar. 13, 2009

(65) Prior Publication Data

US 2009/0205391 A1 Aug. 20, 2009

Related U.S. Application Data

(63) Continuation of application No. 11/209,535, filed on Aug. 23, 2005, now Pat. No. 7,523,634, which is a continuation-in-part of application No. 11/037,419, filed on Jan. 18, 2005, now Pat. No. 7,392,775.

(60) Provisional application No. 60/603,919, filed on Aug. 24, 2004.

(51) Int. Cl.
    *B21D 5/04* (2006.01)
(52) U.S. Cl. .......................... 72/313; 72/387; 72/452.9
(58) Field of Classification Search .................. 72/313, 72/315, 387, 452.8, 452.9
    See application file for complete search history.

(56) References Cited

U.S. PATENT DOCUMENTS

| 4,181,002 A | 1/1980 | Eckold et al. |
|---|---|---|
| 4,535,619 A | 8/1985 | Gargrave |
| 5,101,705 A | 4/1992 | Matsuoka |
| 5,231,907 A | 8/1993 | Matsuoka |
| 5,347,838 A | 9/1994 | Matsuoka |
| 5,746,082 A | 5/1998 | Matsuoka |
| 5,784,916 A | 7/1998 | Matsuoka |
| 5,931,074 A | 8/1999 | Matsuoka |
| 6,016,680 A | 1/2000 | Matsuoka |
| 6,167,741 B1 | 1/2001 | Matsuoka |
| 6,196,040 B1 | 3/2001 | Matsuoka |
| 6,220,137 B1 | 4/2001 | Matsuoka |
| 6,230,536 B1 | 5/2001 | Matsuoka |
| 6,336,399 B1 | 1/2002 | Matsuoka |
| 6,519,995 B2 | 2/2003 | Matsuoka |
| 6,523,386 B2 | 2/2003 | Matsuoka |
| 6,526,797 B2 | 3/2003 | Matsuoka |
| 6,539,766 B2 | 4/2003 | Matsuoka |
| 6,619,095 B2 | 9/2003 | Matsuoka |
| 7,392,775 B2 | 7/2008 | Krozek |
| 7,523,634 B2 * | 4/2009 | Krozek .................. 72/452.9 |

\* cited by examiner

*Primary Examiner*—David B Jones
(74) *Attorney, Agent, or Firm*—Reising Ethington P.C.; Michael C. Adams

(57) ABSTRACT

A filler cam assembly for use with a forming die generally including a center cam component, end cam components and a base assembly and being designed to transition between unloading and forming positions. The various cam components preferably have axial ends with helical surfaces such that rotation of one of the cam components causes a corresponding axial movement of an adjacent cam component. Some features of the filler cam assembly include removable work steels, standardized cam components, drive and lock out mechanisms, and being able to form negative angles, multiple corners and edges, and an entire formable periphery of a metal work piece in a single forming operation, to name but a few.

18 Claims, 12 Drawing Sheets

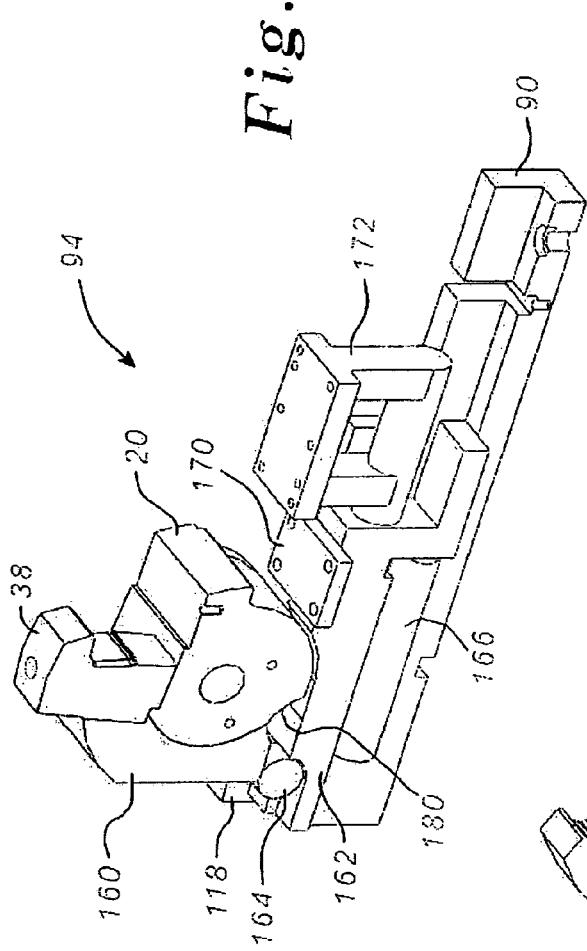
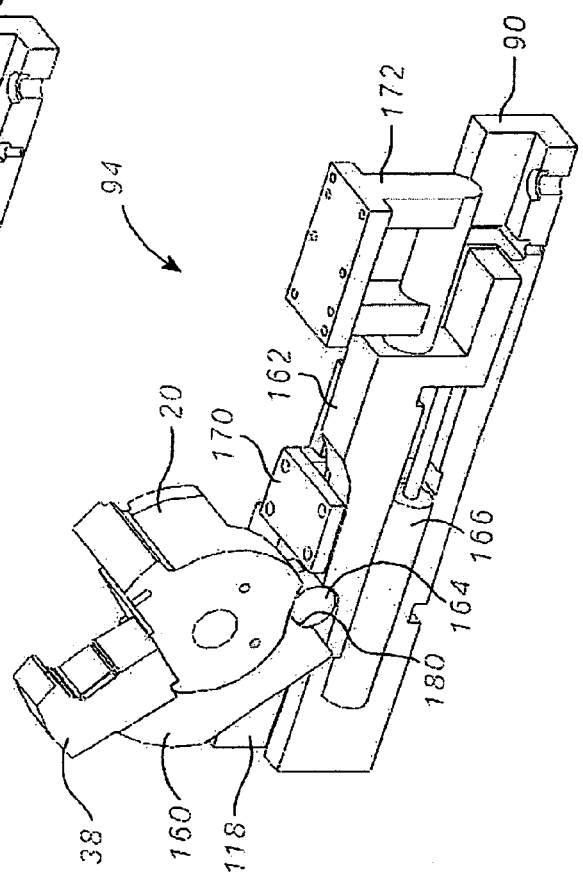

FORMING DIE HAVING FILLER CAM ASSEMBLY

REFERENCE TO RELATED APPLICATIONS

This application is a continuation of copending U.S. application Ser. No. 11/209,535 filed Aug. 23, 2005 which is a continuation-in-part of U.S. application Ser. No. 11/037,419 filed Jan. 18, 2005 and now U.S. Pat. No. 7,392,775, and claims the benefit of U.S. Provisional Application No. 60/603,919 filed Aug. 24, 2004.

TECHNICAL FIELD

The present invention relates generally to a filler cam assembly, and more particularly, to a filler cam assembly for use with a forming die such as those used in the automotive industry for forming difficult angles in metal work pieces.

BACKGROUND OF THE INVENTION

Various types of forming dies have been developed for forming a wide variety of metal part configurations, particularly in the automotive industry. One example of such a forming die utilizes a rotary cam in order to form a negative-angle on piece of sheet metal. A "negative angle" or "back draft" is broadly defined as any angle formed in a metal work piece where at least a portion of the formed section extends more inwardly than a straight downward stroke line (beyond 90°), and is appreciated by those skilled in the art.

It is known in the art to provide a forming die with a lower die half, an upper die half, an upper die pad, a work cam and a rotary cam for forming a piece of sheet metal. The work piece is placed on a post of the lower die half and the rotary cam, then the upper die half is lowered causing the upper die pad to clamp the piece of sheet metal to the lower die post and rotary cam, prior to forming. Next, a work cam (which can be mounted to either the upper or lower die halves) is driven such that the sheet metal work piece is formed to the desired shape. The upper die half continues being lowered until a desired shut height between the upper and lower die halves is achieved. Once the final formed shape is complete the upper die half is raised and the two die halves separate so that the formed sheet metal can be removed.

SUMMARY OF THE INVENTION

According to one embodiment, there is provided a forming die for use in forming a work piece. The forming die generally comprises: a lower die half; an upper die half; a filler cam assembly mounted to either the lower die half or the upper die half; and a work cam assembly mounted to either the lower die half or the upper die half. The filler cam and work cam assemblies engage the work piece and form at least one corner and at least one edge in a single forming operation.

Some examples of objects, features and advantages include, but are certainly not limited to, providing a filler cam assembly that is able to form multiple edges and corners in a single forming process, that has a standard cam component construction for quick, easy and relatively inexpensive cam replacement, that uses replaceable work steels for interchangeability across different programs and for easy work steel replacement, that provides balanced torque and driver contact during operation, that is capable of filling and forming negative-angles and other difficult to form part configurations, that uses standard air cylinders, and that provides a design that is of relatively simple design, economical manufacture and assembly, is serviceable, and has a long and useful life in service, to name but a few. It is not necessary for every embodiment to exhibit each of the above-listed objects, features and advantages, as they are merely exemplary.

BRIEF DESCRIPTION OF THE DRAWINGS

These and other objects, features and advantages will be apparent from the following detailed description of the preferred embodiments and best mode, the appended claims and the accompanying drawings, in which:

FIGS. 7a-d are isometric views of a section of the base assembly of FIG. 5, shown from a perspective that illustrates a lock out mechanism (FIGS. 7a and 7c are in a forming position and FIGS. 7b and 7d are in an unloading position);

DETAILED DESCRIPTION OF THE PREFERRED EMBODIMENTS

Figure 1:
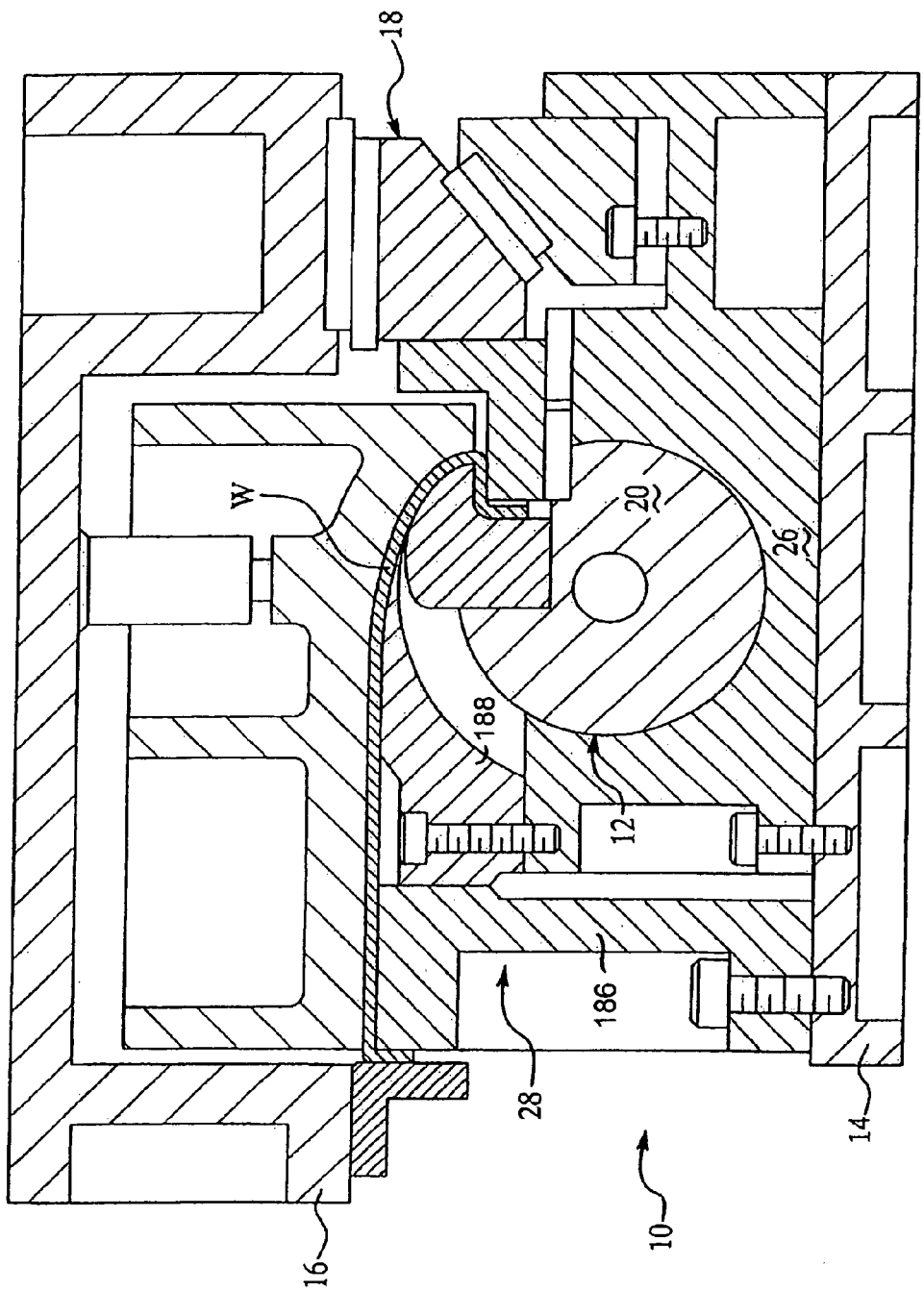
FIG. 1 is a sectional view of an embodiment of a forming die in the closed position generally having a filler cam assembly, an upper die half, a lower die half and a work cam assembly.

With reference to FIG. 1, there is shown an embodiment of a forming die 10 generally having a filler cam assembly 12, a lower die half 14, an upper die half 16 and an aerially-mounted work cam assembly 18 for forming a work piece W. Preferably, work piece W is a metal work piece made of sheet metal, but it could alternatively be made of aluminum-based alloys, magnesium-based alloys, fiberglass, or any other appropriate material known to those skilled in the art.

Forming die 10 is designed to form difficult or complex work piece configurations including, but certainly not limited to, negative angles or back drafts such as those found on vehicle body side panels, fenders, quarter panels, hoods, roofs, deck lids, as well as other class A surfaces. Forming die 10 can also be used to produce a number of non-negative angle formations, such as creases, flanges, hems, beads, darts, pockets, embosses, etc. Furthermore, because of the simplicity, compactness and overall ingenuity of the present filler cam assembly, forming die 10 can not only produce a number of difficult formations, it can also form multiple edges and corners simultaneously such that an entire formable periphery of the work piece can be done in a single forming operation.

Filler Cam Assembly—

Filler cam assembly 12 is designed to rotate between a retracted or unloading position (FIG. 2) and an extended or forming position (FIG. 3) and generally includes center cam component 20, end cam components 22, 24, a base assembly 26 and a post assembly 28. Filler cam assembly 12 preferably utilizes a helical cam, such as that disclosed in U.S. patent application Ser. No. 11/037,416 filed Jan. 18, 2005, or it can use an appropriately designed non-helical cam.

Figure 2:
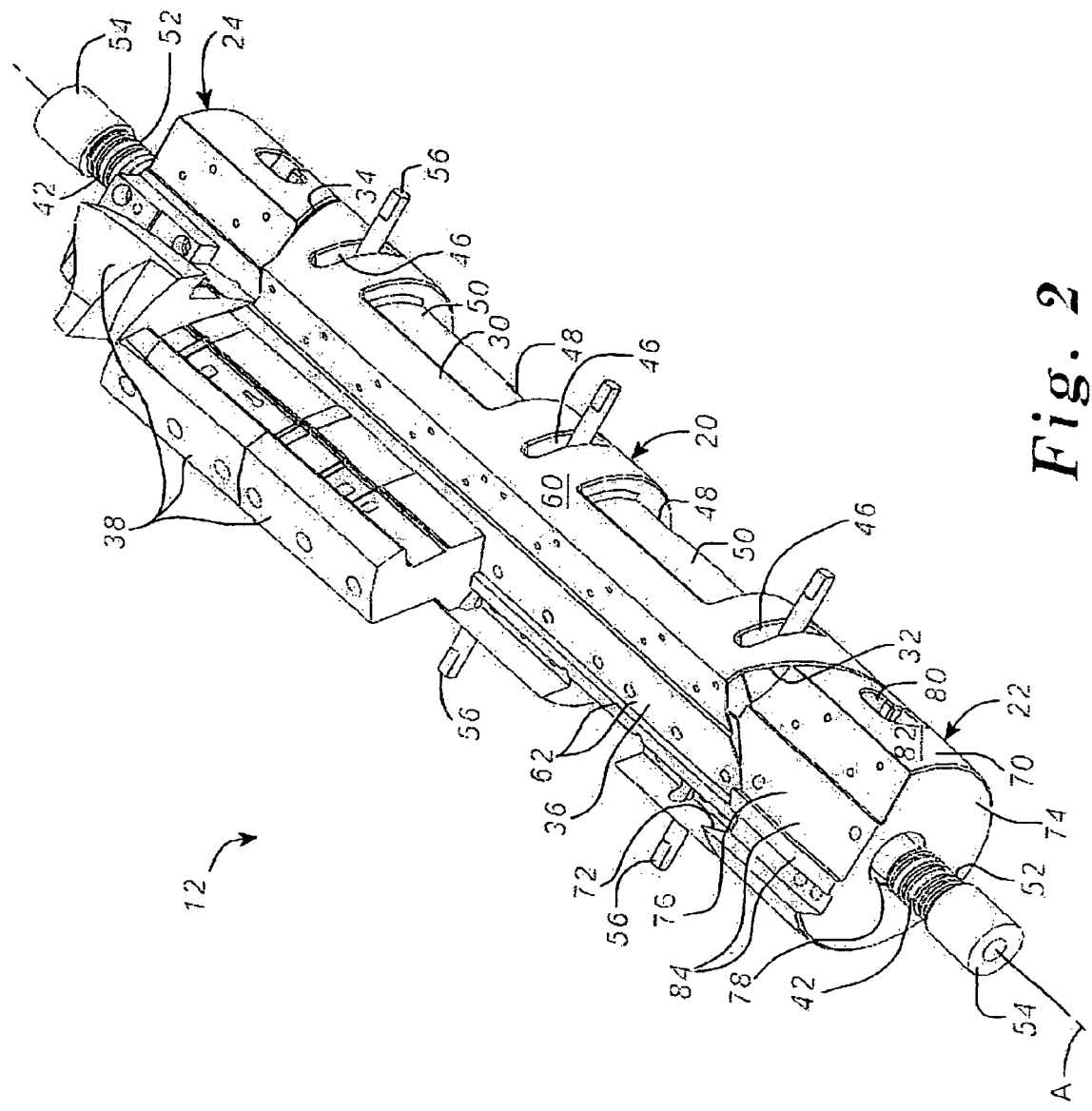
FIG. 2 is an isometric view of the center and end cam components of the filler cam assembly of FIG. 1 having some work steels mounted thereon, the cam components are shown in a retracted or unloading position.
Figure 3:
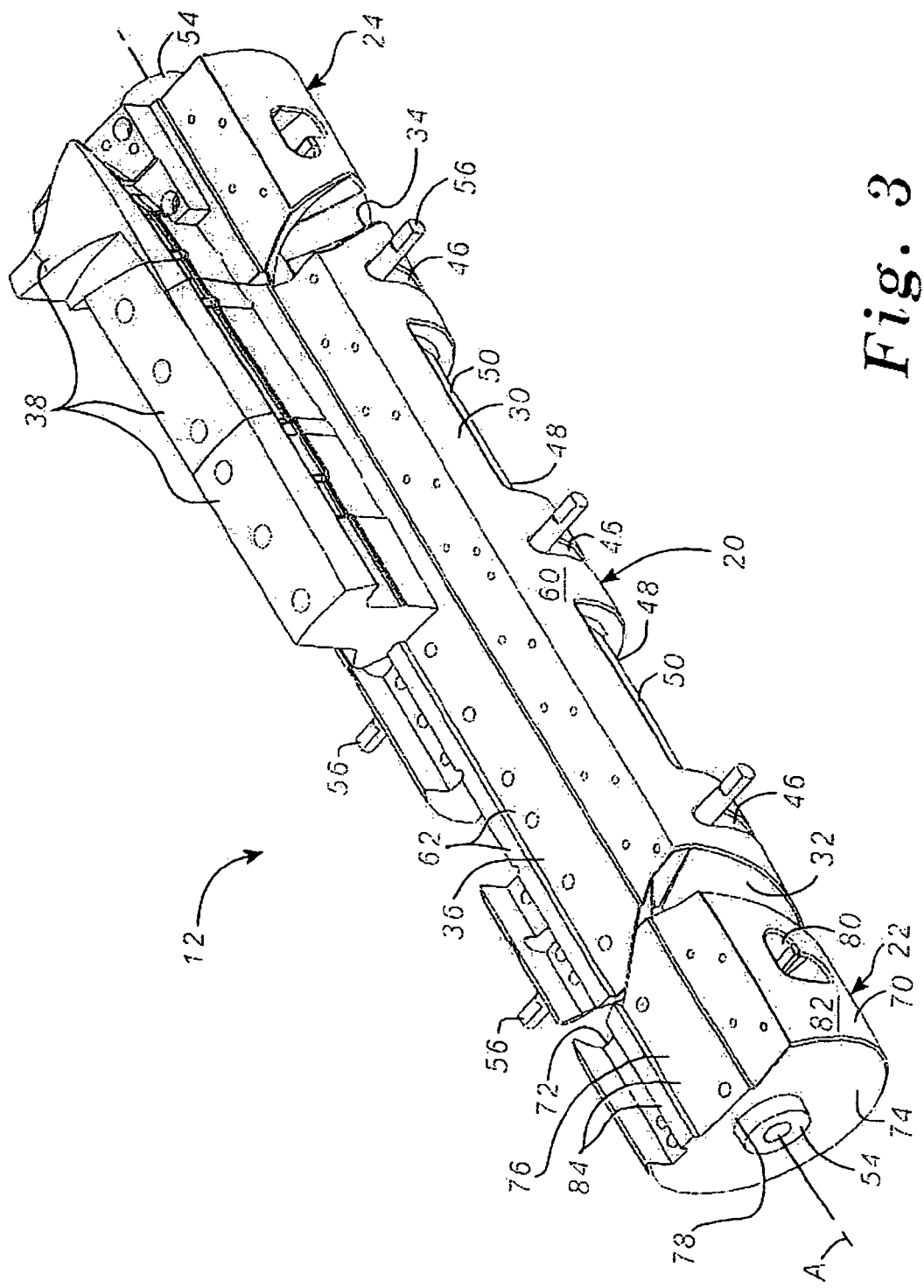
FIG. 3 is an isometric view of the cam components of FIG. 2, shown in an extended or forming position.
Figure 4:
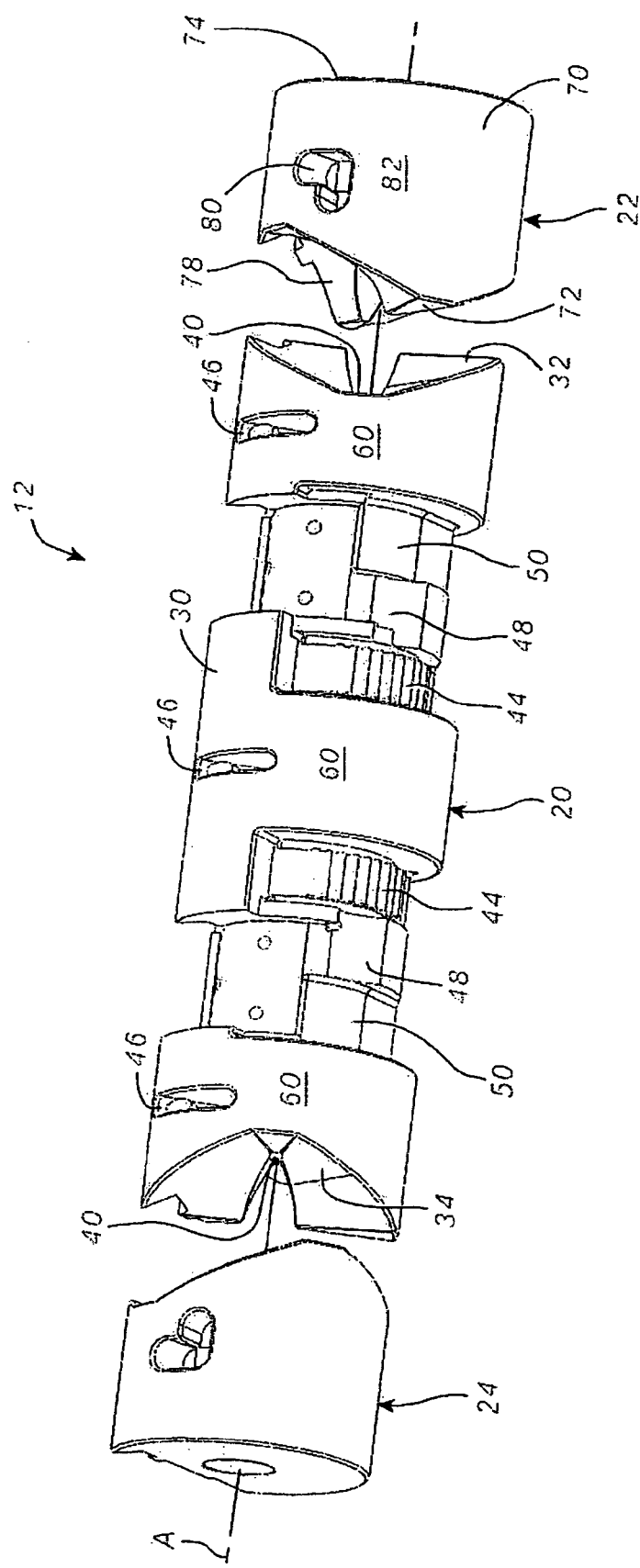
FIG. 4 is an exploded, isometric view of the cam components of FIG. 2, shown from a different perspective.

Turning now to FIGS. 2-4, center cam component 20 and end cam components 22, 24 are shown in greater detail. According to a preferred embodiment, center cam component 20 is an elongated unitary component made of hardened tool steel and is located in between the end cam components 22, 24. The center cam component preferably includes a main body portion 30, axial end surfaces 32, 34, a work steel mounting surface 36, one or more work steels 38, an axial bore 40 for receiving a main shaft 42, circumferential gears 44, barrel slots 46 for receiving cross shafts 56, roller tracks 48 and clearance tracks 50.

Main body portion 30 extends between axial end surfaces 32, 34 and includes portions of a smooth, outer cylindrical surface 60 which is designed to rotate within a complimentarily-shaped nest or cradle in base assembly 26. Outer cylindrical surface 60 and/or corresponding surfaces of the nest may be provided with a flash-chrome, PTFE, or other types of surface coatings and/or treatments in order to reduce the friction and/or wear between the rotating components. Preferably, axial end surfaces 32 and 34 are helical-shaped, as thoroughly described in the above-referenced U.S. patent application, and are designed to contact and rotate against corresponding helical surfaces of end cam components 22 and 24, respectively. Rotational movement of center cam component 20 causes a corresponding axial movement of the end cam components 22, 24; this axial movement results in filler cam assembly 12 transitioning between a retracted or unloading position and an extended or forming position, as mentioned above.

As best seen in FIGS. 2 and 3, work steel mounting surface 36 axially extends along a top side of main body portion 30 so that it can receive one or more work steels 38, which are the actual components contacting work piece W and have a shaped surface generally in the form of the desired part. In this particular embodiment, mounting surface 36 is integrally formed in center cam component 20 and includes an elongated key-way 62 having one or more rabbets and channels designed to receive one or more work steels 38. Each of the work steels 38 has corresponding mounting features so that they can be slid on and off of the cam component with little effort. This not only provides for interchangeability of the work steels 38 so that various parts can be formed with a single filler cam assembly 12, but also provides for easy replacement of the work steels in the event that one is damaged or broken. Mounting features other than key-way 62 can be used, such as threaded bolts, dowels, mounting brackets, etc., and could be used in lieu of or in addition to the key-way in order to properly secure work steels 38 to center cam component 20.

For purposes of illustrating other features, FIGS. 2-3 only show two work steels 38 mounted on center cam component 20, however, additional work steels should be secured to work steel mounting surface 36 so that a continuous forming surface is provided across the axial length of center cam component 20. Work steels 38 are preferably made of hardened tool steel or cast steel and those that adjoin work steels mounted on end cam components 22, 24 preferably have helical side surfaces or axial ends so that when the center and end cam components 20-24 rotate, the work steels 38 can follow their helical paths without interference. According to the particular embodiment shown here, the overall forming surface is broken up between several different work steel components 38, however, a single unitary work steel piece could be used instead. Furthermore, it is possible to attach inserts or other forming elements to work steels 38 to increase or otherwise change the depth and/or shape of the part being formed.

Axial bore 40 longitudinally extends along the entire length of center cam component 20 so that the axial bore can receive a stationary main shaft 42, which allows for rotation of the center cam component about the main shaft as well as within base assembly 26. Main shaft 42 is stationary and generally extends the length of filler cam assembly 12 so that when cam components 20-24 rotate into an extended or forming position (FIG. 3), they do so against the force of torsion/compression springs 52 (FIG. 5) which are located between the end cam components 22, 24 and stop collars 54. The stop collars 54 are securely attached to the ends of main shaft 42 and are designed to seat within heel plates 98 so that they restrict end cam components 22-24 from axially extending beyond a certain point. Each of the springs 52 are slip mounted on main shaft 42 and are located between end cam components 22, 24 and stop collars 54. A thrust washer is located at both ends of spring 52 and relieves the coiling action of the spring as it is compressed and extended. The force of the springs urges end cam components 22, 24 inwardly towards center cam component 20.

With specific reference to FIG. 4, circumferential gears 44 are toothed gear tracks that are preferably integrally formed on center cam component 20 such that they extend a certain circumferential extent around that cam component. In this particular embodiment, circumferential gears 44 extend for approximately 30°-80°, and even more desirably about 45°, and are generally located on an underside of center cam component 20. These integral gears interact with a filler cam drive mechanism, which will be subsequently explained, in order to rotate center cam component 20 as well as end cam components 22, 24. It is possible to provide circumferential gears 44 not as integral-type gears, but as separate gear tracks that are removably attached to center cam component 20. According to this embodiment, if there is any damage to the circumferential gears, then they can simply be removed and replaced without having to replace the entire center cam component.

Barrel slots 46 are elongated slots also formed in center cam component 20 and are designed to interact with cross-shafts 56 which extend through main shaft 42 such that the rotational travel of the center cam component is guided by the barrel slots. The particular barrel slots 46 shown here completely pass through the center cam component, thus allowing cross-shafts 56 to extend from one side of the center cam component to the other. Because these particular barrel slots 46 follow a circumferential path, they permit center cam component 20 to rotate but without any axial travel. It is possible to provide non-circumferential barrel slots that provide for a more complex movement of center cam component 20. Cross-shafts 56 are inserted through holes 58 in the nest 112 in order to more securely locate them in place, and for simplifying the assembly process. Roller tracks 48 circumferentially extend around a certain extent of center cam component 20 and are designed to be contacted by a roller component of base assembly 26, while clearance tracks 50 are notched out sections of center cam component 20 and provide clearance for a locking mechanism, both of which will be subsequently explained in greater detail.

The two end cam components are generally symmetrical, thus the following description of end cam component 22 also pertains to component 24, which is shown having a work steel 38 mounted thereto. According to a preferred embodiment, end cam component 22 is a generally cylindrical component made of the same material as center cam component 20. End cam component 22 generally includes a main body portion 70, axial end surfaces 72, 74, a work steel mounting surface 76, an axial bore 78 and a barrel slot 80. The main body portion 70 is typically shorter in axial length than that of the center cam component 20 and extends between axial end surfaces 72, 74. As with the center cam component 20, end cam component 22 is designed to rotate within a complimentarily-shaped nest in base assembly 26 and therefore includes a smooth, outer cylindrical surface 82 that can include a flash-chrome, PTFE or other types of friction- and/or wear-reducing surface coatings. Preferably, axial end surface 72 is helical-shaped, as discussed above, and axial end surface 74 is generally planar. Axial end surface 74 could include a small groove formed in it such that it generally surrounds axial bore 78 opening and provides a means for capturing and positioning an end of spring 52. It is possible to add additional cam components such that axial end surface 74 contacts and rotates against them; in such an embodiment, axial end surface 74 would preferably be helical so that several end cam components could be serially lined up and driven by a single center cam component. It is also possible to have axial end surface 74 rotate against some other non-planar surface, such as a cam follower surface on base assembly 26; in such an embodiment, axial end surface 74 would be designed to compliment the shape of the opposing surface.

Work steel mounting surface 76 works in a similar manner to the work steel mounting surface 36 previously described, and includes mounting features 84 such as key-ways. Again, each of the work steels 38 that are to be mounted have corresponding mounting features so that they can be slid on and off of the cam component with little effort. A comparison of FIGS. 2 and 3 reveals a misalignment of the work steel mounting surfaces 36 and 76 when the filler cam 12 is in a retracted or unloading position (FIG. 2) and an alignment of those same work steel mounting surfaces when it is in an extended or forming position (FIG. 3). This is because it is desirable to have the corresponding work steels of the center and end cam components 20-24 in alignment when work cam assembly 18 is forming the part, as will be subsequently explained in greater detail.

Axial bore 78 longitudinally extends along the entire length of end cam component 22 and allows it to be journaled on main center shaft 42. According to the particular embodiment shown here, the axial bores of the center and end cam components are coaxial so that they can rotatably interact with a single, stationary shaft 42, as mentioned. It is possible, however, to provide the end cam components 22, 24 in a non-coaxial arrangement with respect to center cam component 20. In an embodiment such as this, each of the cam components 20-24 could be journaled on separates shafts, which could be parallel to one another or angled with respect to one another, and the corresponding nest of the lower die half 14 would have to be designed to allow for such an arrangement.

Barrel slot 80 is formed in end cam component 22 and is designed to interact with a roller extending from the nest of base assembly 26. As is appreciated by those skilled in the art, the particular design of barrel slot 80 with both axial and circumferential legs allows for both rotational and axial travel of end cam component 22. The particular extent and path of that travel is dictated by the shape of the barrel slot and can differ from that shown here. More complex barrel slots such as those having spiral or other paths could be used in order to guide end cam component 22 along a predetermined path of travel. If required, clearance tracks similar to those found on center cam component 20 could be added for clearance of nearby components or for material savings.

Figure 5:
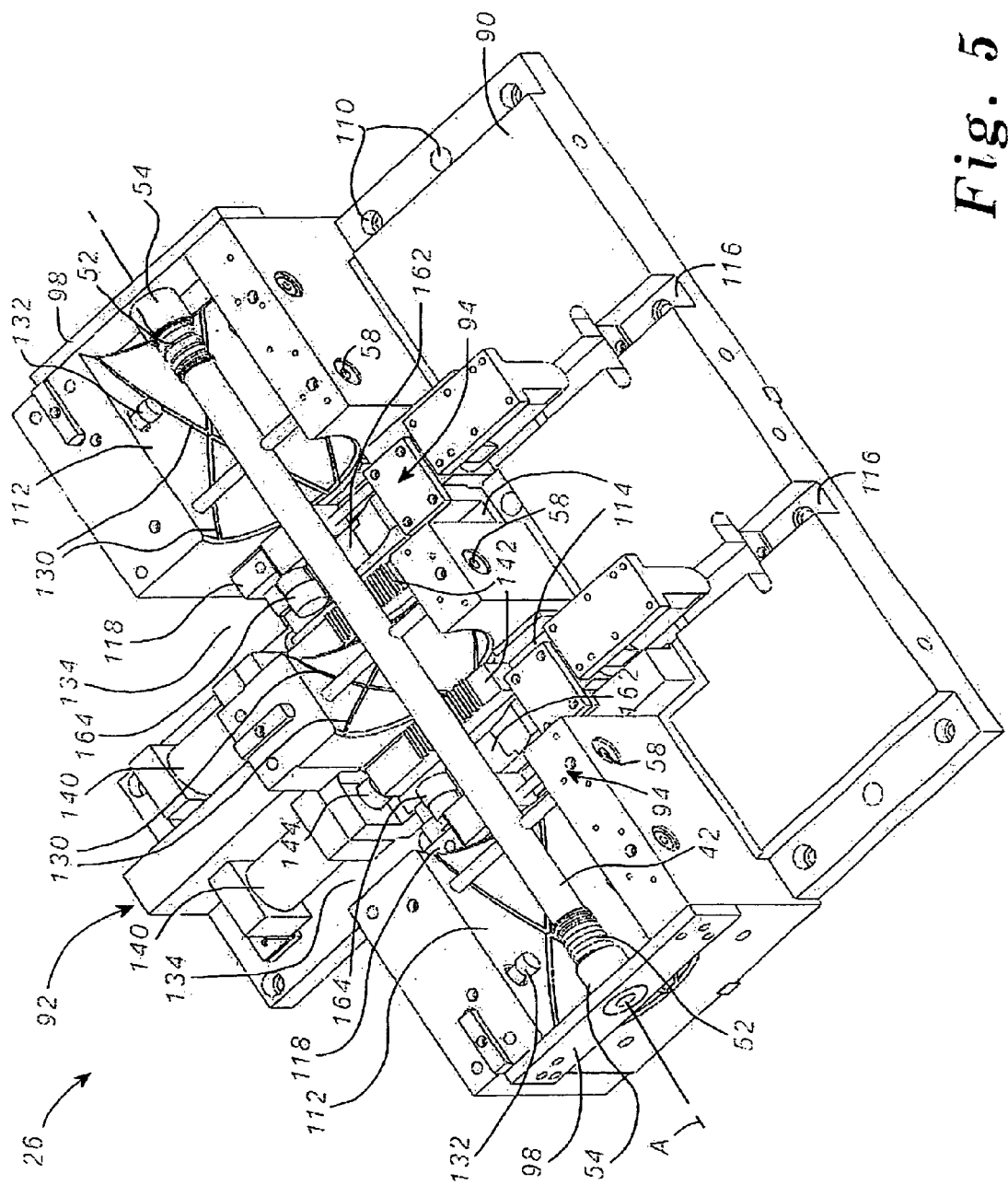
FIG. 5 is an isometric view of the base assembly of the filler cam assembly of FIG. 1, shown without the center and end cam components.
Figure 6:
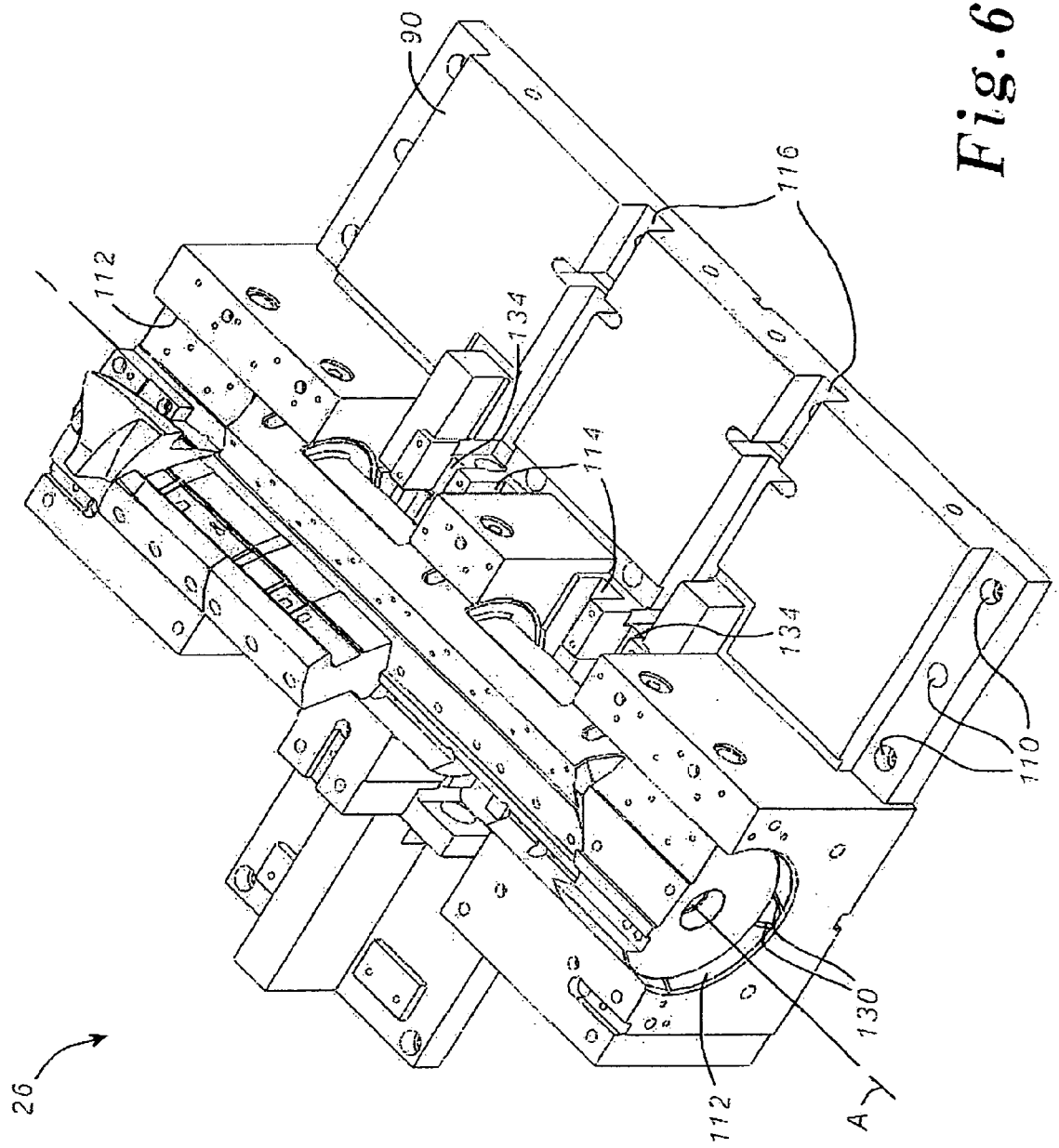
FIG. 6 is an isometric view of the base assembly of FIG. 5, shown with the center and end cam components and several work steels mounted thereon.

Referring now to FIGS. 5-7, base assembly 26 provides a nest for operably receiving the center and end cam components 20-24 just described and for securing filler cam assembly 12 to lower die half 14. The base assembly 26 generally includes a base or foundation 90, a drive mechanism 92 and a lock out mechanism 94, as well as a number of other base-related components. Base 90 is preferably a cast and machined foundation made from durable flame hardened steel and generally includes mounting features 110 such as cross keys, location pins, threaded bolts, etc. for securing filler cam assembly 12 to lower die half 14, a nest 112, drive cam tracks 114, lock out drive tracks 116 and stop blocks 118.

Nest 112 preferably has a generally semi-circular cross-section for rotatably accommodating center and end cam components 20-24 and can be coated with an appropriate surface treatment such as flash chrome, PTFE, or friction-reducing and/or wear-resistant surface treatments known to those skilled in the art. Nest 112 preferably extends the entire length of base component 90 so that it is open on both ends, and includes relief grooves 130, roller bearings 132, and openings 134 for accommodating components of lock out mechanism 94. Relief grooves 130 criss-cross the cylindrical surface of nest 112 and provide channels for removing debris that could otherwise interfere with the rotational movement of cam components 20-24. In addition, elongated rubber strips or wipers could be mounted to base 90 along the length of the clearance space located between the various cam components and nest 112 in order to help keep out debris such as metal shavings that can gull-up the cams. Roller bearings 132 are preferably sealed roller bearings mounted on an extension shaft (not shown) and extend inwards into the space defined by nest 112 and are designed to interact with barrel slots 80 located on the outer surfaces of end cam components 32, 34. As previously explained, the barrel slots 80 and roller bearings 132 dictate the movement of the end cam components so that they follow a desired, predetermined path during operation. According to the particular embodiment shown here, two pairs of openings 134 are formed in the side walls of nest 112 and expose the interior of nest 112 to the drive and lock out mechanisms 92, 94. One reason for openings 134 is to allow a stop plate 160, which is part of the lock out mechanism 92 and is attached to center cam component 20, to rotate without interference from the side walls of the nest.

Drive cam track 114 and lock out track 116 are open channels that preferably extend transversely to the longitudinal axis of nest 112. Tracks 114, 116 operably receive components of drive and lock out mechanisms 92, 94, respectively, so that those components can index back and forth in the tracks during operation and be easily installed and removed if necessary. Each of the stop blocks 118 provides a contact surface for a corresponding component of lock out mechanism 94 and will be subsequently described in more detail. Preferably, stop blocks 118 can be adjusted up, down, fore and aft so that the operator can set them according to the particular needs of the application.

Drive mechanism 92 provides the linear force or movement needed to rotate center cam component 20, and generally includes a pair of air cylinders 140 and a gear rack 142. As best seen in FIG. 5, each of the air cylinders 140 is generally transversely aligned with respect to longitudinal axis A so that a corresponding piston 144 can extend towards and away from nest 112. Secured to piston 144 is gear track 142, which is a generally elongated component have upwardly-pointing gear teeth on an upper surface and being smooth on a lower surface so that it can easily slide within drive cam track 114. The gear teeth of gear tracks 142 are designed to mesh and interact with the gear teeth of circumferential gears 44 which are located on an underside of center cam component 20. When air cylinders 140 are activated they cause gear racks 142 to index forward and backward so that they interact with circumferential gears 44, thereby causing a corresponding rotation of center cam component 20. It is preferable that gear racks 142 be dwelled during the forming operation so that they are not damaged.

Figures 7A, 7B:
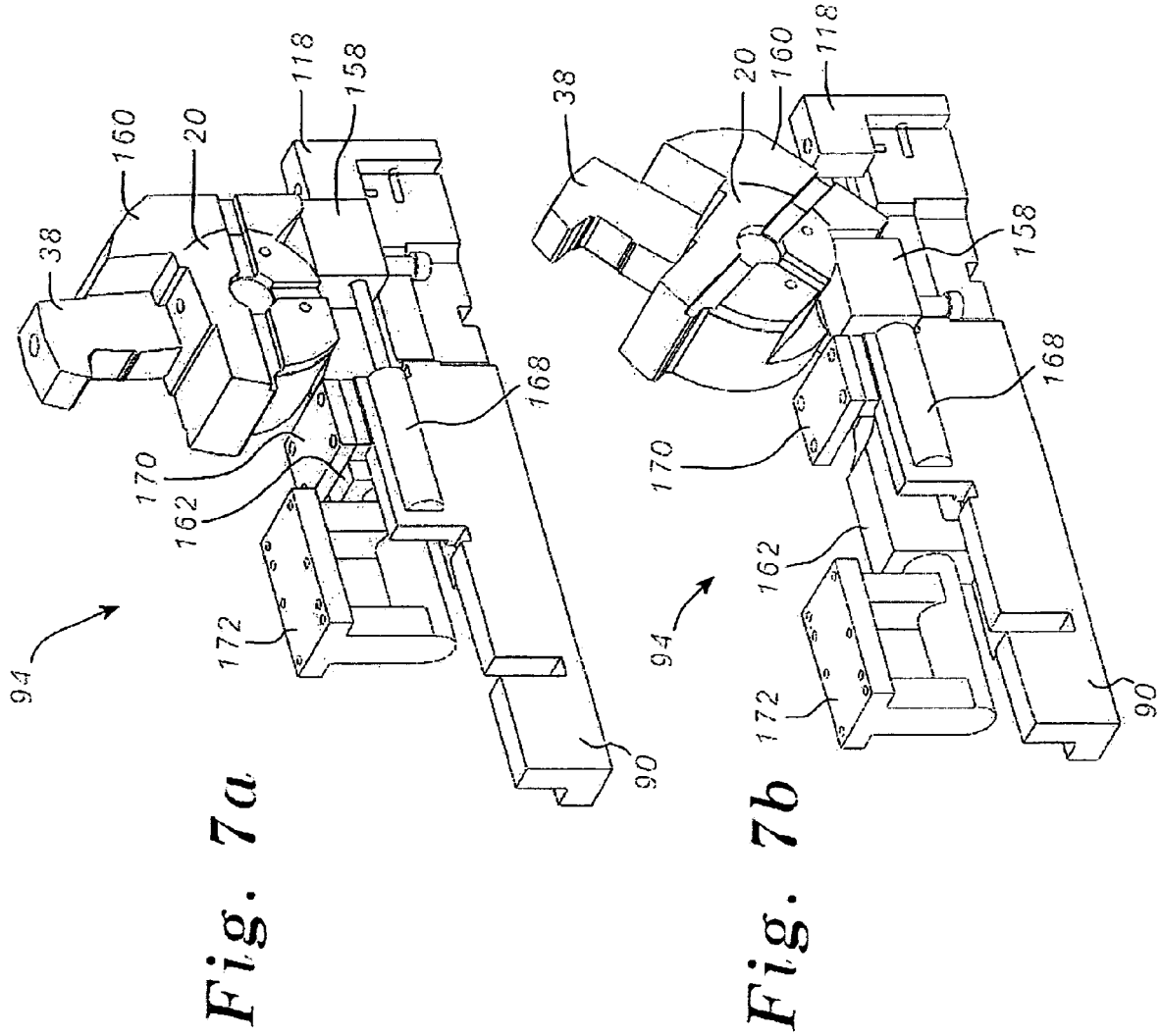

Lock out mechanism 94 supports center cam component 20 during the forming operation and provides a secondary failure mode release for rotating and retracting the center and end cam components 20-24 in the event that drive mechanism 92 fails. With specific reference to FIGS. 7a-d, lock out mechanism 94 generally includes pairs of stop blocks 158, stop plates 160, accelerators 162, rollers 164 and cylinders 166, 168. Each stop block 158 slides within a channel in base 90 and fits underneath of center cam component 20 such that the center cam component can rest on them during the forming operation (FIGS. 7a, 7c). Each of the stop plates 160 mounts directly to the outside of center cam component 20 and limits the rotation of the center cam component by contacting stop block 158, which has an adjustable height. During the forming operation when significant forces are exerted upon filler cam assembly 12, the contact between stop plates 160 and stop blocks 158 allows some of the forming forces to be transferred downwards to base component 90 and/or lower die half 14 and thus relieve some of the pressure from the filler cam assembly 12.

Each of the accelerators 162 works with a corresponding roller 164 and is designed to rotate center cam component 20 in the event of a failure mode; that is, in the situation where drive mechanism 92 experiences some type of failure and cam components 20-24 are stuck in an extended or forming position. Accelerator 162 is an elongated component designed to slide underneath center cam component 20 and rotatably carries roller 164 at one end and contacts work cam ram 172 at the other end such that the accelerator can index back and forth under the guidance of lock out tracks 116 and bracket 170. Roller 164 rolls along roller track 48 of the center cam component when it is rotating and is designed to mate with a detent or notch 180 formed in the roller track. At the same end of accelerator 162 as roller 164, the accelerator has a tab or keeper lip (not shown) extending laterally such that it can contact stop block 158. When accelerator 162 moves from the unloading position (FIGS. 7b, 7d) to the forming position (FIGS. 7a, 7c), the tab retains stop block 158 and causes the stop block to slide with it against the bias of cylinder 168, which is preferably a self-contained nitrogen cylinder. Persons skilled in the art will appreciate that self-contained nitrogen cylinders generally act as a spring, and that numerous alternative devices could be used instead. Cylinder 166 biases accelerator 162 outwardly generally away from center cam component 20, while cylinder 168 biases stop block 158 in the opposite direction. Put differently, cylinders 166, 168, both of which are preferably self-contained nitrogen cylinders, counteract one another such that when one is compressed the other is extended and visa-versa. It is preferable that cylinder 166 be more powerful than cylinder 168.

Figure 8:
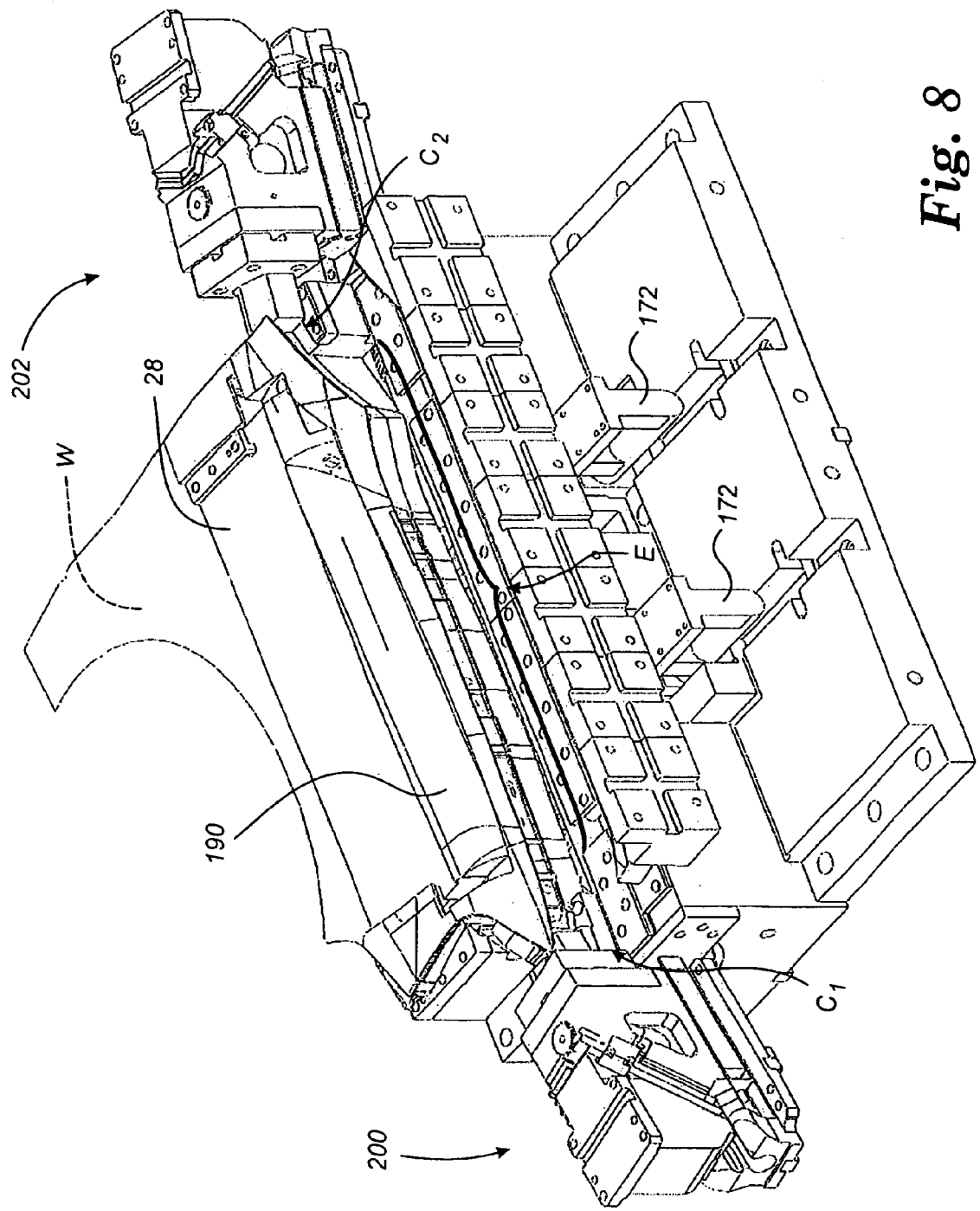
FIG. 8 is an isometric view of the base assembly of FIG. 5, shown with a work piece W in phantom to illustrate portions of a supporting post below.

Post assembly 28 supports metal work piece W during the forming process and therefore includes an upper surface machined in the shape of the formed part. With reference to FIGS. 1 and 8, post 28 includes a pedestal 186, and a cantilevered support 188 having a work piece contact surface 190. Pedestal 186 is mounted to lower die half 14 and is preferably adjacent to cantilevered support 180, which has a recessed section and the work piece contact section 190. When filler cam assembly 12 is in the forming position, the work steels of cam components 20-24 are aligned such that they act as a general continuation of work piece contact surface 190. As is best appreciated from FIG. 1, the post 28 is machined underneath the section that abuts filler cam assembly 20 such that a partially circumferential space is created between the post and filler cam assembly to provide clearance for the rotating work steels 38.

Lower and Upper Die Halves—

Referring back to FIG. 1, forming die 10 is shown having filler cam assembly 12 mounted on a lower die half 14 and positioned so that upper die half 16 can be lowered into place in order to produce a formed part. It should be noted, filler cam assembly 12 can be used with one of a number of different forming dies, lower die halves, upper die halves and/or work cam assemblies. Thus, it is not necessary that filler cam assembly 12 be used with the specific upper and lower die halves 14, 16 and work cam assembly 18 shown here, as the filler cam assembly could be used in many other embodiments known to those skilled in the art.

For instance, the specific forming die 10 shown here utilizes an aerially mounted work cam mounted to upper die half 16, however, a die-mounted work cam mounted to lower die half 14 could be used just as easily. Lower die half 14 provides a foundation for filler cam assembly 12, and even more specifically base assembly 26, and is designed to mate with upper die half 16. Because filler cam assembly 12 can be used with so many different lower and upper die half designs and because lower and upper die halves are well known in the art, a more detailed recitation of their structure has been omitted.

Work Cam Assembly—

The particular work cam assembly 18 shown here is an aerial work cam; that is, the work cam assembly is mounted to and carried by the upper die half 16. If work cam assembly 18 was mounted to the lower die half 14 instead, then it would be referred to as a die-mounted work cam. Filler cam assembly 12 can be used with either an aerial work cam or a die-mounted work cam, as both types are commonly understood in the art.

According to this particular embodiment, work cam assembly 18 includes at least three separate work cams 200, 202 and a third assembly that has been removed from FIG. 8 for illustration of other components. Work cam 200 forms a first corner $C_1$ of work piece W, work cam 202 forms a second corner $C_2$ of the work piece, and a third work cam assembly (not shown) which is located between work cams 200 and 202 and mounts on base 26 and/or work cam rams 172 and forms a lengthwise edge E of the work piece. Therefore, the specific forming die 10 shown here having a single filler cam assembly 12 is at least capable of forming first and second corners $C_1$ and $C_2$ and a lengthwise edge E located therebetween in a single forming operation. Of course, one or more work cams could be added to or taken away from the form die shown here. Again, because filler cam assembly 12 can be used with so many different work cam assemblies and because work cam assemblies are well known in the art, a more detailed recitation of their structure has been omitted.

During operation, filler cam assembly 12 transitions between unloading and forming positions to permit forming work piece W in a single operation with a complex peripheral configuration, including an edge formation E along a side of the work piece and first and second corner formations $C_1$ and $C_2$ at corners of the work piece. The 'unloading position' is broadly defined as any retracted position of the filler cam assembly where a work piece can be either loaded onto or unloaded from the tool. Conversely, the 'forming position' is broadly defined as any extended position of the filler cam assembly where a work piece can be formed by one or more work cams.

Beginning with the unloading position shown in FIGS. 2, 6, 7b and 7d, an operator properly positions a work piece W on filler cam assembly 12 and post assembly 28. Once work piece W is positioned correctly, the air cylinders 140 of drive mechanism 92 are activated such that they index gear racks 142 in a generally linear motion. The indexing gear racks 142 interact with circumferential gears 44 on center cam component 20, which causes a corresponding rotation of the center cam component. As previously explained, rotation of the center cam component causes helical surfaces on its axial ends 32, 34 to operably contact and engage helical surfaces on the axial ends of end cam components 22, 24, respectively, which in turn preferably causes corresponding axial and rotational movement of the end cam components. It is this transition between the unloading position to the forming position that causes end cam components 22, 24 to fill out first and second corners $C_1$, $C_2$ of work piece W so that they, along with a lengthwise edge E, can be formed during a single forming operation.

During this unloading to forming position transition, several different events take place. First, end cam components 22, 24 are forced outwardly on main shaft 42 such that they follow the paths defined by barrel slots 80 and compress springs 52 against the stop collars 54. The compression force stored in springs 52 is later used to return end cam components 22, 24 to the unloading position. Second, rotation of center cam component 20 causes detent 180 in roller track 48 to grab roller 164 of the lockout mechanism and slide the entire accelerator 162 against the force of cylinder 166, which acts much like a spring. Because cylinder 168 is now free to exert its force on stop block 158, as accelerator 162 and more importantly the laterally extending tab have slid to a position where they do not contact the stop block, stop block 158 is pushed underneath center cam 20 by cylinder 168 until it hits stop block 118 (best seen in FIG. 7a). All of this occurs before work cam assembly 18 is moved into place, thus, when work cam rams 172 start to index, the accelerators have already been moved. In fact, rams 172 do not contact the accelerators again until they catch up with them in a position similar to that shown in FIG. 7c, at which point work cam rams 172 continue to push against accelerators 162 so that they are dwelled during the forming process. During the forming process, the work steels mounted on end cam components 22, 24 fill different corners $C_1$, $C_2$ and center cam component 20 fills an elongated edge E of the work piece W so that all of these formations can be formed in a single forming operation, thus obviating the need to transfer the work piece W to a second form die.

Once work piece W has been formed, the filler cam assembly undergoes a forming position to unloading position transition that is largely the reverse of the process just described. Drive mechanism 92 again activates air cylinders 164 such that gear racks 142 are moved, which causes a reverse rotation of center cam component 20. This center cam component rotation causes roller tracks 48 to engage rollers 164 and drive accelerators 162 to the unloading position shown in FIGS. 7b, 7d. As the accelerators are being driven in lock out tracks 116, the laterally extending tab on the accelerators 164 grabs stop blocks 158 and pulls them against the force of cylinders 168. Concurrently, springs 52 return end cam components 22, 24 to their unloading position so that the formed work piece W can be removed from the tool and a new work piece can be loaded. Of course, a number of additional events can occur and do occur, as is appreciated by those skilled in the art.

During a failure mode, drive mechanism 92 does not work so cam components 20-24 can be stuck in the extended or forming position and therefore will not release the metal work piece W. In order to cycle filler cam assembly 12 back to the retracted or unloading position, cylinders 166 (which act as a redundant or backup drive mechanism) can be activated so that they laterally index accelerator 162 and attached roller 164. The roller engages detent 180 in roller track 48, as previously mentioned, so that center cam component 20 is rotated into the unloading position so that the part can be unloaded and the filler cam assembly can be fixed.

Multi-Filler Cam Embodiment—

Figure 9:
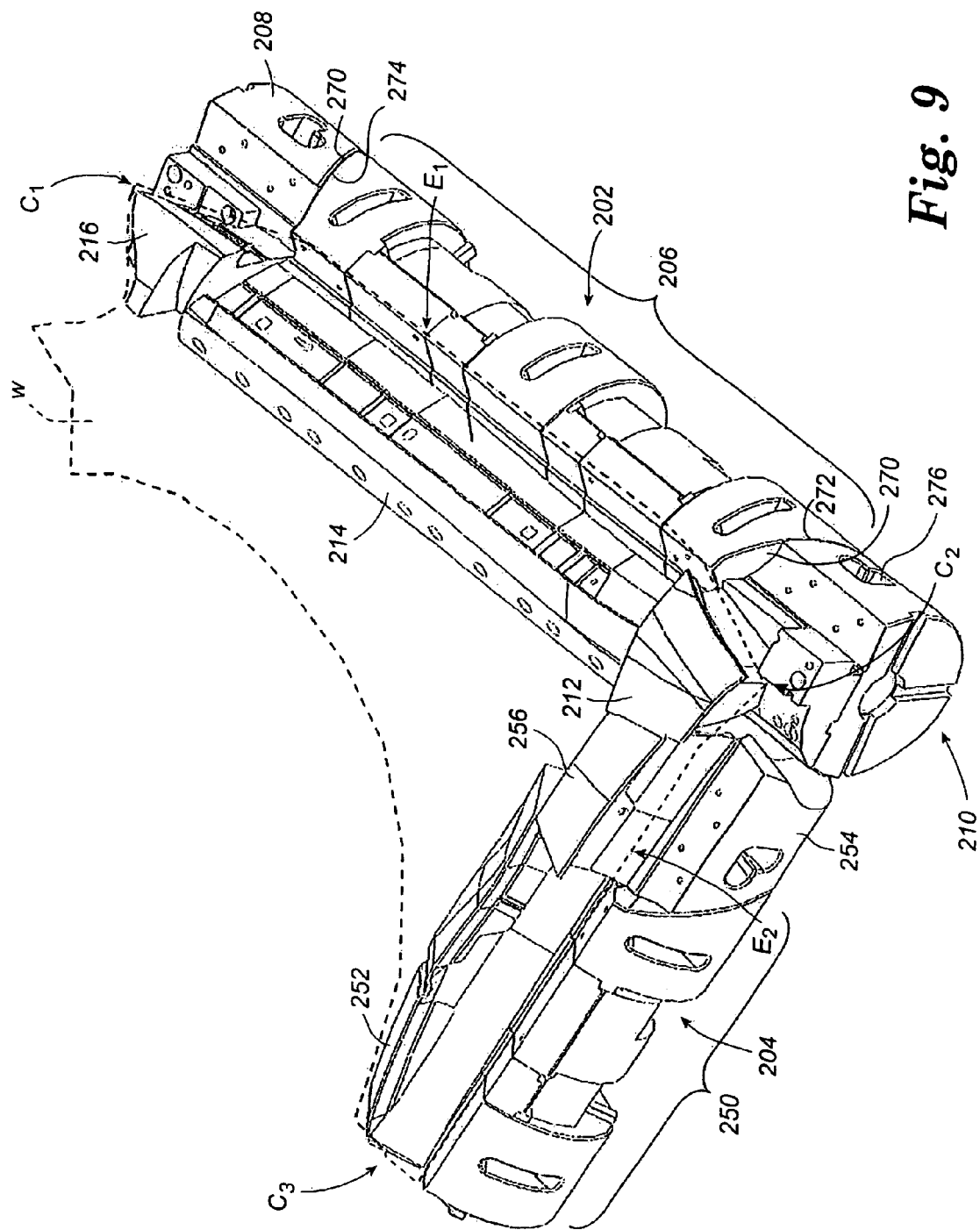
FIG. 9 is an isometric view of a portion of an embodiment of a multi-filler cam assembly capable of filling an entire formable perimeter of a work piece in a single forming operation, shown with a work piece W in phantom to illustrate the mating of the various cam components and work steels.
Figure 10:
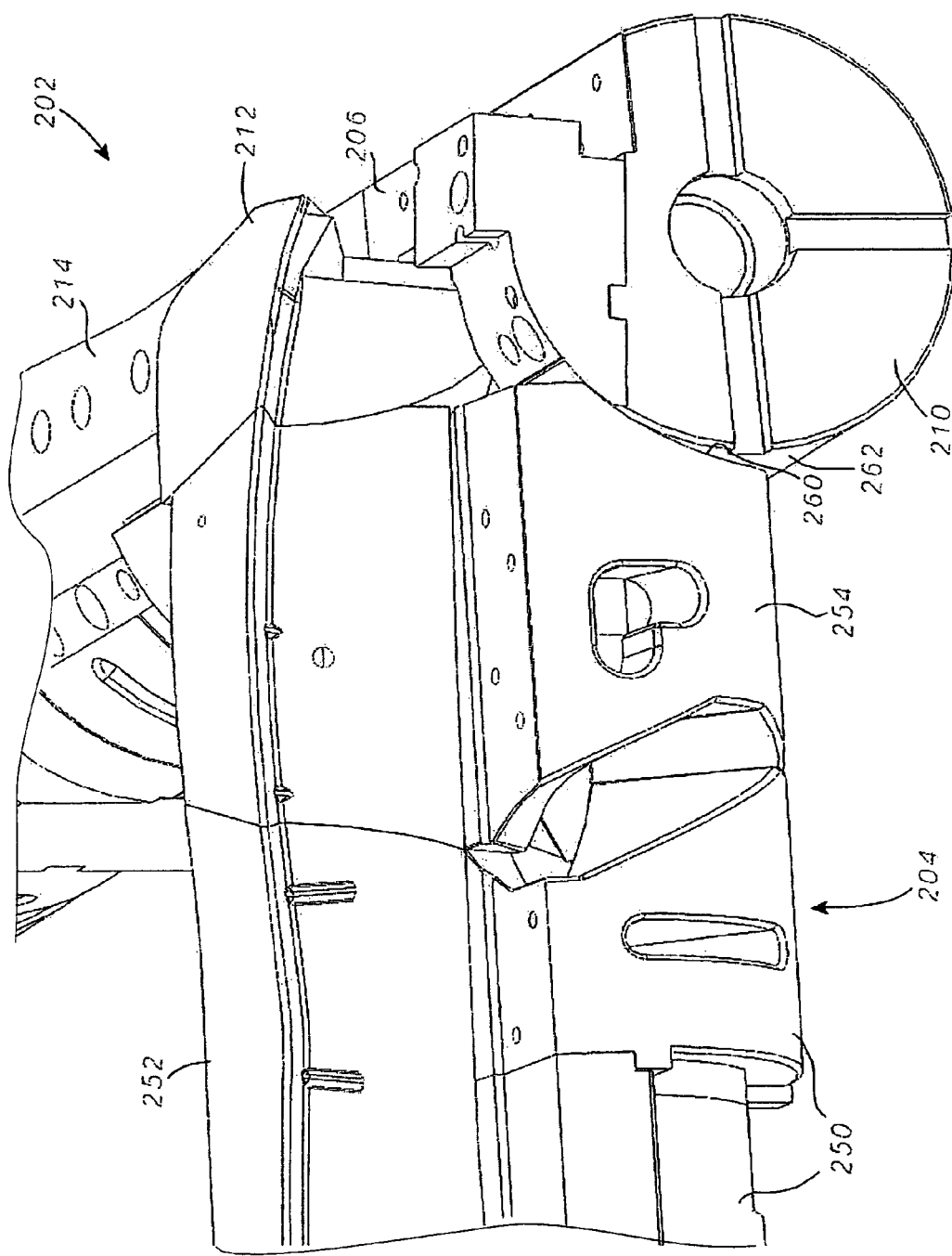
FIG. 10 is an enlarged view of the multi-filler cam assembly embodiment of FIG. 9, but with the work piece W removed.

With reference now to FIGS. 9 and 10, there is shown a portion of a multi-filler cam embodiment 200, however, this embodiment has multiple filler cam assemblies 202, 204 which fill the entire formable periphery of work piece W so that it can be formed in a single forming operation. The term 'entire formable periphery' generally includes those sections of the periphery of a work piece that need to be formed with a form die. In the case of the example of FIG. 9, the entire formable periphery includes corners $C_1$, $C_2$, $C_3$ (if needed) and edges $E_1$ and $E_2$, which can include (but do not need to) one or more negative angles. Each of the filler cam assemblies 202, 204 is largely the same as that previously described, thus the previous description of filler cam assembly 12 is applicable here as well.

Filler cam assembly 202 fills a first corner $C_1$, a first lengthwise edge $E_1$ and a second corner $C_2$ so that both corners and the lengthwise edge can be formed in a single forming operation, and generally includes a center cam component 206 and end cam components 208 and 210. As with the previous embodiment, each of the cam components 206-210 has work steels 212-216 mounted thereto, respectively, for forming a part of the work piece W. According to the particular embodiment shown here, work steel 212 and end cam component 210 are adjacent to and end cam and work steel of the other filler cam assembly 204 and thus need to shaped to mate with those components. It should be noticed that the particular configuration of work steel 212 turns the entire corner and is not split along a generally 45° line, as many prior art devices are. This provides for a much more robust work steel that is less susceptible to breaking or being damaged.

Filler cam assembly 204 forms a second lengthwise edge $E_2$ and could form a third corner $C_3$ if needed by simply adding a corner work steel, although the particular embodiment shown here does not appear to require a tucked corner $C_3$. According to this particular embodiment, filler cam assembly 204 includes a center cam component 250 having a work steel 252 mounted thereto, and it has an end cam component 254 with a corresponding work steel 256. As best seen in FIG. 10, end cam component 254 includes an end mating surface 260 for contacting a side mating surface 262 of end cam component 210, and work steel 256 includes an end mating surface 264 that is designed to operably contact a side mating surface 266 of work steel 212. Both of the end mating surfaces 260, 264 are preferably helical shaped so that end cam component 254 and work steel 256 can be smoothly moved into a complimentary position. Furthermore, barrel slots allowing for more complex rotational and/or axial movement of the end cam components could be added to one or more of the end cam components, as previously explained.

During operation, both filler cam assemblies 202, 204 begin in a retracted or unloading position (FIG. 9) so that a work piece W can be properly placed on the tool. According to the particular embodiment shown here, a drive mechanism (not shown) of filler cam assembly 202 is first activated such that it causes a clockwise rotation of center cam component 206 (when looking down its axis from end cam component 210), which causes a corresponding rotation and outwardly axial movement of end cam components 208 and 210. As previously explained in greater detail, helical surfaces 270 located on the axial ends of center cam component 206 interact with helical surfaces 272, 274 located on the axial ends of end cam components 210, 208, respectively, such that the end cam components rotate and move axially according to a path determined by barrel slots 276. Once filler cam assembly 202 is in the extended or forming position (FIG. 10), then filler cam assembly 204 is driven. A drive mechanism (not shown) imparts a counterclockwise rotation of center cam component 250 (when looking down its axis from end cam component 254) which causes end cam component 254 to rotate and axially slide into place so that end mating surface 260 nests up against side mating surface 262, as does 264 against 266. In the forming position shown in FIG. 10, the entire formable periphery of work piece W can then be formed in a single forming operation involving various work cams (not shown) which would be opposing filler cam assemblies 202, 204. Once the work piece is formed, filler cam assembly 204 retracts, followed by filler cam assembly 202, and then the formed part can be removed from the tool.

Of course, the forming operation does not have to follow the precise sequence of general steps outlined above; for example, form die 200 could be designed such that filler cam assembly 204 cycles first, followed by filler cam assembly 206. Also, the timing of the filler cam assemblies could be modified so that a second filler cam assembly began moving shortly after a first one or at the same time, and thus does not wait for the first filler cam assembly to be completely in place before beginning its transition.

It will thus be apparent that there has been provided a forming die having a filler cam assembly, lower and upper die halves and a work cam assembly, as well as a method of operation, which achieve the aims and advantages specified herein. It will of course be understood that the foregoing description is only of preferred exemplary embodiments, and that the invention is not limited to the specific embodiments shown.

Figure 11:
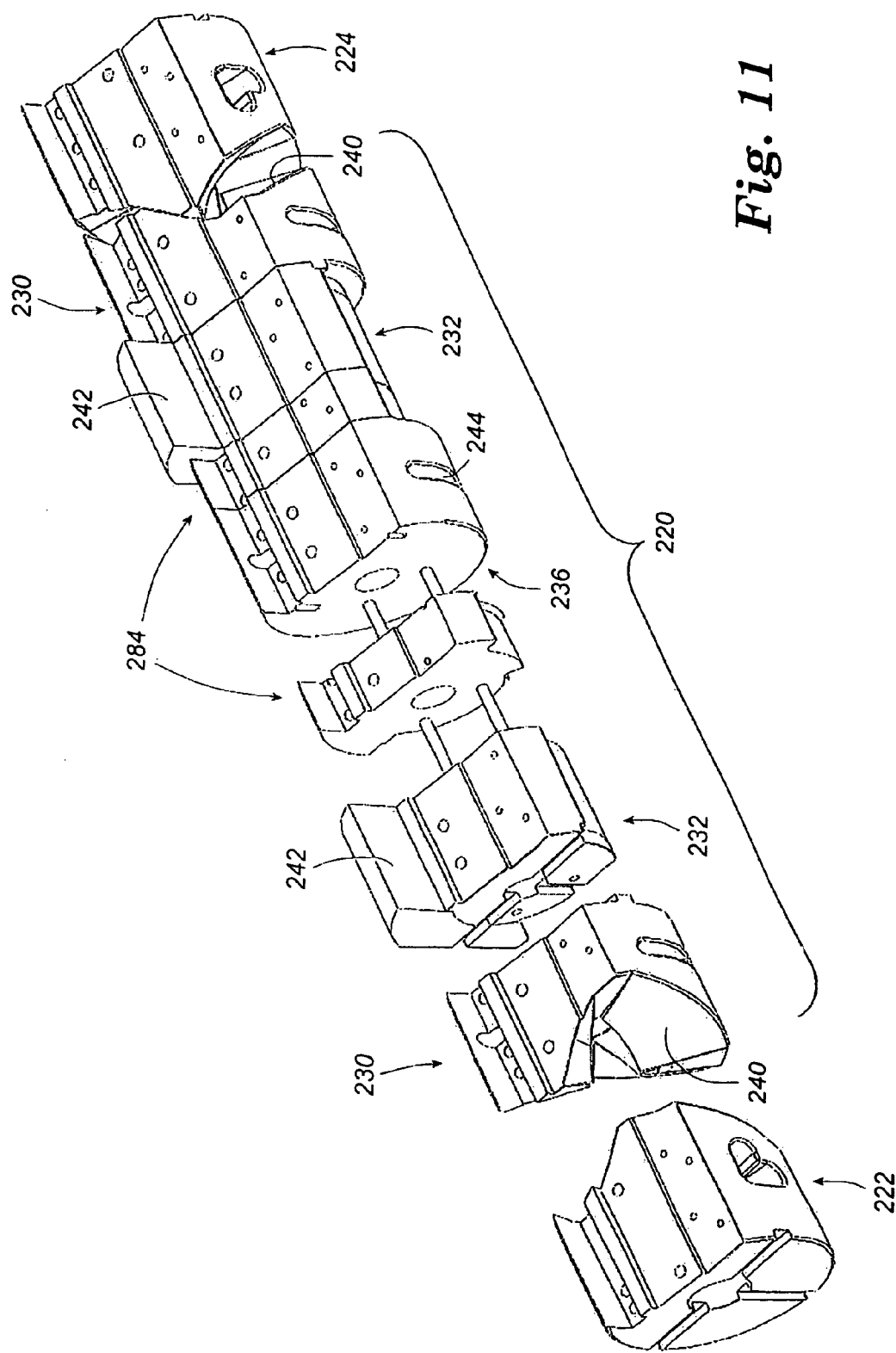
FIG. 11 is an exploded, isometric view of the cam components of another embodiment, where the center cam component is comprised of a number of smaller components.

For example, FIG. 11 shows a center cam component 220 that is comprised of a number of separate, smaller components 230-236 that are generally cross-sectional pieces joined together to collectively form the center cam component 220. According to the particular embodiment shown here, end pieces 230 have helical surfaces 240 and are located on the ends of the center cam component 220, fillers 232 carry stop plates 242 and are connected to end pieces 230, gears 234 are connected to fillers 232, and additional fillers 236 having barrel slots 244 are connected to gears 234. By manufacturing center cam component 220 in a number of smaller, interchangeable pieces, the center cam component becomes somewhat standardized in that these standard parts can be arranged in different combinations in order to build numerous center cam embodiments. Thus, a customer would only need to stock the various, standardized center cam elements which could be used across a number of different filler cam assemblies, instead of having to purchase and stock one-of-a-kind rotary cams that can only be used in a specific application. Of course, the actual combination and arrangement of the center cam components 230-236 can vary from that shown here, and the same use of smaller generally cross-sectional components applies to end cam components 222 and 224 as well.

Furthermore, it is also possible for filler cam assembly to have a total of two, three, four or more cam components all of which are generally coaxially aligned. In the event that four or more cam components are used, there could be multiple center and end cam components that rotatably interact with one another in a manner similar to that previously described. Although the drawings of this application show center cam component 20 generally located in the center of filler cam assembly 12, it is possible to have a filler cam assembly with a center cam and just one end cam, in which case the center cam component would not necessarily be located in the center of the filler cam assembly, yet it would still share a majority of characteristics with the center cam component 20 just described.

Various changes and modifications will become apparent to those skilled in the art and all such variations and modifications are intended to come within the scope of the appended claims.

I claim:

1. A forming die for use in forming a work piece, comprising:
   a lower die half;
   an upper die half;
   a filler cam assembly mounted to either said lower die half or said upper die half, said filler cam assembly includes at least one cam component and a drive mechanism for rotating said cam component, both said cam component and said drive mechanism are mounted to the same die half; and
   a work cam assembly mounted to either the lower die half or the upper die half, wherein the filler cam and work cam assemblies engage the work piece and form at least one corner and at least one edge in a single forming operation.

2. The forming die of claim 1, wherein said filler cam assembly comprises:
   a first cam component having a main body portion and at least one axial end with a helical surface;
   a second cam component having a main body portion and at least one axial end with a helical surface; and
   a base assembly having a nest for receiving said first and second cam components such that said helical surfaces operably contact one another, wherein rotation of said first cam component causes a corresponding axial movement of said second cam component.

3. The forming die of claim 1, wherein said drive mechanism further includes an air cylinder operably coupled to a gear rack, operation of said air cylinder causes movement of said gear rack, which in turn causes rotation of said at least one cam component.

4. The forming die of claim 2, wherein said first cam component is a center cam component and further includes an axial bore, a work steel mounting surface and circumferential gears for operably engaging said drive mechanism.

5. The forming die of claim 4, wherein said axial bore receives a stationary main shaft so that said center cam component can rotate about said main shaft and within said nest.

6. The forming die of claim 5, wherein a cross shaft extends through said main shaft and interacts with a barrel slot formed in said center cam component such that rotation of said center cam component is guided by said barrel slot.

7. The forming die of claim 4, wherein said work steel mounting surface includes mounting features for removably securing at least one work steel thereon.

8. The forming die of claim 7, wherein said mounting features include an elongated key-way that interacts with a corresponding key-way located on said at least one work steel.

9. The forming die of claim 4, wherein said circumferential gears are integrally formed into said center cam component main body portion.

10. The forming die of claim 2, wherein said first cam component is a unitary component.

11. The forming die of claim 2, wherein said first cam component is comprised of a plurality of smaller, generally cross-sectional pieces joined together to collectively form said first cam component.

12. The forming die of claim 2, wherein said second cam component is an end cam component and further includes a barrel slot for guiding both the rotational and axial movement of said end cam component.

13. The forming die of claim 2, wherein said filler cam assembly further includes a third cam component having at least one axial end with a helical surface for operably contacting a helical surface of a second axial end of said first cam component.

14. The forming die of claim 13, wherein each of said cam components includes an axial bore for receiving a stationary main shaft having a stop collar and a spring located at each end, wherein first and second springs urge said second and third cam components inwardly towards said first cam component, respectively.

15. The forming die of claim 13, wherein rotation of said first cam component causes said second and third cam components to extend to forming positions such that first and second corners of the work piece are formed in a single forming operation.

16. The forming die of claim 2, wherein said filler cam assembly further includes a lockout mechanism for supporting said first cam component during a forming process and for providing a failure mode release.

17. The forming die of claim 16, wherein said lockout mechanism generally includes an accelerator, a roller rotatably mounted to said accelerator, and a stop block, when said filler cam assembly is in a forming position said stop block is generally located beneath said first cam component and when said assembly is in an unloading position said roller is in contact with said first cam component.

18. The forming die of claim 2, wherein said filler cam assembly is used to form at least one negative angle.

* * * * *